United States Patent Office 3,325,981
Patented June 20, 1967

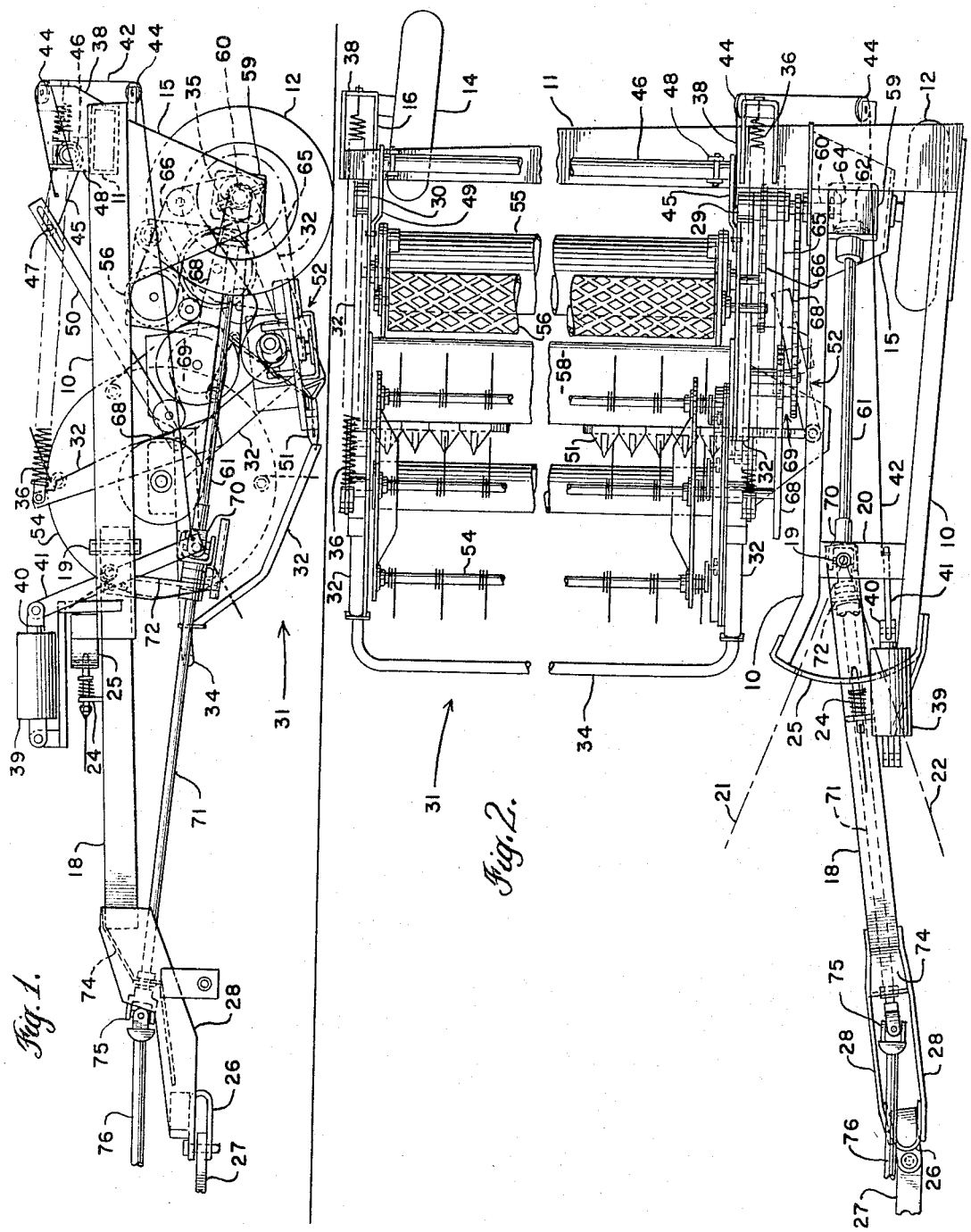

3,325,981
HAY HARVESTING MACHINE
Emmett F. Glass, Akron, and John K. Hale, New Holland, Pa., assignors to Sperry Rand Corporation, New Holland, Pa., a corporation of Delaware
Filed Jan. 5, 1965, Ser. No. 423,525
7 Claims. (Cl. 56—23)

This invention relates to a harvesting machine for hay or the like which is towed behind a tractor and receives its operating power from the tractor power-take-off shaft.

The particular purpose of the machine is to mow a wide swath of hay, crack the stems of the stalks to facilitate drying, and deposit the crop back on the ground for drying and subsequent harvesting operations. The stem cracking operation is known as "conditioning" and, except for certain machines known as windrowers or swathers, is generally performed by separate hay conditioning implements independently of the mowing operation. Windrowers, on the other hand, are relatively expensive, special purpose, self-propelled machines having their own engine and power chassis, as opposed to the machine of the present invention which is towed by and driven from a separate tractor or the like.

Attempts in the past to combine mowing and conditioning mechanism in a single trail type implement have failed to produce a machine of lasting commercial acceptance; presumably because the capacity and ruggedness required could not be achieved at a cost figure acceptably competitive with conventional mowing-conditioning implements.

It is an object of this invention to provide a trail type harvesting machine for hay or the like wherein the various basic elements of the machine are integrated in a novel manner to provide ruggedness, efficiency, mechanical simplicity and low manufacturing cost.

It is another object of this invention to provide a trail type harvesting machine capable of harvesting a swath of material substantially as wide as the machine itself.

It is another object of this invention to provide a compact, economical trail type harvesting machine having driven mowing and conditioning means which are free to floatingly follow the ground contour.

It is another object of this invention to provide a trail type hay harvesting machine having a rugged mobile main frame, a floating implement carrying sub-frame and implement drive means all inter-related in a manner to economically mow and condition a wide swath of crop material in a single operation.

It is another object of this invention to provide a compact economical trail type machine of minimum overall width for mowing and conditioning a wide swath of crop material, which machine is adapted to trail behind a towing vehicle during road transport and to trail in a laterally offset relation to the towing vehicle during operation in a field.

These and other objects and advantages of this invention will be apparent upon reference to the following description and claims taken in conjunction with the accompanying drawings wherein:

FIG. 1 is a side elevational view of a hay harvesting machine constructed in accordance with the principles of the present invention; and FIG. 2 is a plan view of the machine of FIG. 1 with the center portion of the machine broken out to condense the figure.

Referring now to the drawings in detail, the machine has a rugged, generally L-shaped base frame comprising a pair of generally parallel fore-and-aft extending main frame members 10 disposed along the left side of the machine relative to the direction of travel. The machine is intended to be drawn from right to left as seen in the drawings. A main frame member 11 of box shaped cross section extends transversely from main frame members 10 at the rear of the machine. The L-shaped main frame structure is supported on ground wheels 12 and 14 which are, respectively, journalled in brackets 15 and 16. The bracket 15 is rigidly connected to and depends from main frame members 10 and 11 at the apex of the L-shaped frame. Bracket 16 depends from main frame member 11 at the extreme right end thereof. A draft tongue 18 extends forwardly from the fore-and-aft extending leg of the main frame structure. Draft tongue 18 is connected by a vertical pivot member 19 to a horizontal bracket 20 (FIG. 2) extending between the two fore-and-aft main frame members 10. This enables the draft tongue 18 to be swung laterally between the limits indicated by the broken lines 21 and 22 shown in FIG. 2. Because of the width of the machine (in excess of 11 feet) it is desirable for the machine to trail directly behind a towing vehicle during transport over the highways. This towing relationship is achieved by swinging the drawbar 18 to the position indicated by the line 21 in FIG. 2. When in operation in a field, however, it is desirable for the machine to be laterally offset from the towing vehicle to avoid running over the uncut crop with the tractor. This towing relationship is established by swinging draft tongue 18 to the left from broken line 21 toward the position indicated by line 22 in FIG. 2. To adapt the machine for optimum positioning with tractors of different wheel widths, a spring loaded locking pin 24 is mounted atop draft tongue 18. Pin 24 is engageable in any one of a series of holes in a positioning bracket 25 carried by fore-and-aft extending main frame members 10. At the forwardmost end of draft tongue 18, a hitch coupling or clevis 26 is provided for connecting the draft tongue in towing relation to a drawbar 27 of a tractor or the like. The hitch coupling is supported from arms 28 extending downwardly and forwardly from opposite sides of the draft tongue 18.

A pair of sleeve journals 29 and 30 (see FIG. 2) depend from transverse main frame member 11. These journals are carried on depending plates similar to the ground wheel journalling brackets 15 and 16. The journals 29 and 30 define a pivot axis which extends transverse to the direction of travel of the frame, or parallel to transverse main frame member 11. This axis happens to extend substantially through the center of left ground wheel 12 as may be seen in FIG. 1.

A sub-frame structure, indicated generally by the reference numeral 31, is mounted on journals 29 and 30 for vertical swinging movement about the pivot axis of these journals. Sub-frame structure 31 has a plurality of rigidly interconnected frame members 32 (see FIG. 1) duplicated at each side of the sub-frame. Various cross frame members, as indicated by the cross bar 34 at the front of the sub-frame, complete the sub-frame structure. Two of the members 32, one at each side of the sub-frame, carry split collars 35 (FIG. 1) which serve to journal the sub-frame on sleeve journals 29 and 30. Thus, the sub-frame is free to pivot up and down relative to the L-shaped main frame about the axis of these journals. Counterbalancing springs 36 are interconnected between side sub-frame members 32 and brackets 38 mounted on transverse main frame member 11. These springs counterbalance the weight of the sub-frame structure and allow it to float along the contour of the ground.

The sub-frame must be raised off the ground for transport between fields and over highways. To accomplish this, a hydraulic cylinder 39 is mounted on main frame member 10 at the front of the main frame. The cylinder has conventional coupling means, not shown, for connection to the tractor hydraulic system. The plunger 40 of cylinder 39 is connected to a lever 41 which is journalled on a horizontal pivot on tongue mounting bracket 20. A cable 42 extends rearwardly from lever 41, around a pair of pulleys 44 at the rear of the main frame, and is anchored on a lift arm 45. Lift arm 45 is rigidly mounted on a cross shaft 46 which is journalled in brackets 48 atop main frame member 11. An identical lift arm 49 is fixed to the right end of shaft 46. The lift arms 45 and 49 have pin and slot connections 47, as may be seen in FIG. 1, with downwardly and forwardly inclined arms 50 anchored on sub-frame side members 32. The pin and slot connections 47 allow the sub-frame to float relative to the lift linkage. When cylinder 39 is actuated, the lever 41 exerts a pull on cable 42 which pivots lift arm 45, cross shaft 46 and lift arm 49 upwardly (clockwise as seen in FIG. 1). This first takes up the lost motion afforded by the pin and slot connections 47 and then lifts the sub-frame 31 about journals 29 and 30 through inclined arms 50.

A sickle type mower 51, having a driving head 52, is mounted on sub-frame 31 adjacent the ground and extends transverse to the direction of travel. Forwardly, above and parallel to mower 51 a crop gathering reel 54 of the cam operated tine type is journalled. A pair of coacting crop conditioning rolls 55 (lower) and 56 (upper) are journalled on sub-frame 31 rearwardly of mower 51. A crop guide plate 58 (FIG. 2) is mounted on sub-frame 31 and extends upwardly and rearwardly from mower 51 toward the bite of conditioning rolls 55 and 56. The cross bracing effect of the mower, reel and rolls adds to the rigidity of the sub-frame structure 31.

A conventional right angle gearbox 59 is rigidly mounted on the main frame wheel journalling bracket structure 15 at the apex of the L-shaped main frame. Gearbox 59 has a transversely extending power output shaft 60 which is coaxial with the predetermined pivot axis of the sub-frame defined by journals 29 and 30. Gearbox 59 has an upwardly and forwardly inclined (FIG. 1) power input shaft 61 which extends forwardly along main frame fore-and-aft members 10. Bevel gears 62 and 64 within gearbox 59 transmit driving power from input shaft 61 to output shaft 60.

A first endless drive belt 65 transmits driving power from output shaft 60 to mower driving head 52. A second endless drive chain 66 transmits driving power from output shaft 60 to sprockets on the conditioning rolls 55 and 56. A third endless drive train 68 transmits driving power from output shaft 60 to the crop gathering reel 54. These three drive trains may be considered conventional; the mower drive belt having a large diameter drive pulley on the output shaft 60 and a smaller diameter driven pulley on the mower driving head to effect operation of the mower at approximately seven hundred cycles per minute; the conditioning roll drive chain having a smaller drive sprocket than the mower on output shaft 60 and larger diameter sprockets on the individual rolls to produce a roll peripheral speed of approximately twelve miles per hour; and the reel having a small diameter drive sprocket on the output shaft 60, an intermediate speed reducing sprocket-pulley unit 69 mounted on sub-frame 31 and a large diameter driven pulley on the reel shaft to effect a peripheral reel speed of between five and nine miles per hour. As may be seen in FIG. 1, each of the endless drive members should be provided with a tension controlling idler member.

The power input shaft 61 of gearbox 59 extends upwardly and forwardly from the gearbox and is provided with a universal joint 70 vertically under the pivot member 19 of draft tongue 18. Input shaft 61 has an upwardly inclined forward extension 71 which is journalled in brackets 72 and 74 depending from draft tongue 18. The forwardmost end of input shaft forward extension 71 projects above the hitch coupling 26 between coupling mounting plates 28 and is provided with a universal joint coupling 75 to a conventional telescoping power-take-off extension shaft 76 which connects to the power-take-off shaft of the tractor.

With the machine of this invention the simple rugged main frame supplies the necessary strength and rigidity at minimum cost and weight. The compactness of the sub-frame in the fore-and-aft direction results in a strong light weight sub-frame assembly. The position of the transverse pivot axis of the sub-frame provides optimum floatation characteristics and facilitates raising of the sub-frame to road transport position. The mounting of the gearbox on the main frame with its output shaft coaxial with the sub-frame pivot axis greatly simplifies and reduces the cost of the drive mechanism as well as reducing the need for excess width of the main frame over that of the sub-frame. The total result is a trail type machine of minimum overall width capable of harvesting a swath of hay or the like of maximum width at minimum cost.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. An agricultural machine adapted to be towed behind a vehicle having power-take-off means, said machine comprising the combination of a main frame, a sub-frame mounted on said main frame for pivotal movement about a predetermined axis between a lowered operative position and a raised transport position, a gearbox having a power output shaft, said predetermined axis and the axis of said power output shaft being substantially the same axis, said gearbox having a power input shaft adapted to be connected in driven relation to said power-take-off means of said towing vehicle, crop harvesting means carried on said sub-frame, and means drivingly connecting said power output shaft to said crop harvesting means.

2. An agricultural machine adapted to be towed behind a vehicle having power-take-off means, said machine comprising the combination of a main frame, a sub-frame mounted on said main frame for vertical pivotal movement relative to the main frame about a predetermined axis between a lowered operative position and a raised transport position, a reciprocable mower and a pair of crop conditioning rolls carried by said sub-frame, a gearbox on said main frame and having a power output shaft whose axis lies substantially on said predetermined axis, said gearbox having a power input shaft adapted to be connected in driven relation to said power-take-off means of said towing vehicle, and means drivingly connecting said power output shaft to said mower and said conditioning rolls.

3. An agricultural machine adapted to be towed behind a vehicle having power-take-off means, said machine comprising the combination of a main frame, a sub-frame mounted on said main frame for pivotal movement between a lowered operative position and a raised transport position about a predetermined transversely extending horizontal axis, a reciprocable mower carried by said sub-frame and extending transverse to the direction of travel, a pair of cooperative crop conditioning rolls journalled on said sub-frame behind said mower and extending parallel thereto, a gearbox carried by said main frame and having a power output shaft parallel to and disposed generally on said predetermined axis, said gearbox having a power input shaft extending forwardly toward said towing vehicle and adapted to be connected in driven relation to said power-take-off means, and means drivingly connecting said power output shaft to said mower and said conditioning rolls.

4. An agricultural machine adapted to be towed behind a vehicle having power-take-off means, said machine comprising the combination of a generally L-shaped main frame having a first leg extending in the direction of travel of the towing vehicle and a second leg extending transverse to the direction of travel, a sub-frame carried by said main frame along one side of said first leg and in front of said second leg, means mounting said sub-frame on said main frame for vertical pivotal movement about a predetermined axis between a lowered operative position and a raised transport position, crop harvesting means carried on said sub-frame, a gearbox carried by said main frame adjacent the apex of said first and second main frame legs, said gearbox having a power output shaft disposed substantially on said predetermined axis and a power input shaft extending in the direction of extent of said first leg of said main frame, means connecting said power input shaft in driven relation to said power-take-off means on said towing vehicle, and means drivingly connecting said power output shaft to said crop harvesting means.

5. An agricultural machine adapted to be towed behind a vehicle having power-take-off means, said machine comprising the combination of a generally L-shaped mobile main frame having a first leg extending in the direction of travel of the towing vehicle and a second leg extending transverse to the direction of travel, a sub-frame carried by said main frame along one side of said first leg and in front of said second leg, means mounting said sub-frame on said main frame for vertical pivotal movement about a predetermined horizontal axis between a lowered operative position and a raised transport position, said predetermined axis being spaced below and extending substantially parallel to said second leg of said main frame, a reciprocable mower carried by said sub-frame and extending transverse to the direction of travel, a pair of crop conditioning rolls carried by said sub-frame behind said mower and extending parallel thereto, a gearbox carried by said main frame adjacent the apex of said first and second main frame legs, said gearbox having a power output shaft coaxial with said predetermined axis and a power input shaft extending forwardly along said first leg of said main frame for connection in driven relation to said power-take-off means on said towing vehicle, and means drivingly connecting said power output shaft to said mower and said conditioning rolls.

6. An agricultural machine adapted to be towed behind a vehicle having power-take-off means, said machine comprising the combination of a generally L-shaped main frame, wheels journalled on said main frame and supporting the frame for movement over the ground with one leg of said frame extending in the direction of travel and the other leg of the frame extending transverse to the direction of travel at the rearmost end of said one leg, hitch means carried by said one leg at the forwardmost end thereof for connection to a towing vehicle, a sub-frame structure carried by said main frame and disposed alongside said one main frame leg and in front of said other main frame leg, a reciprocable mower carried by said sub-frame structure and extending transverse to the direction of frame travel, a pair of cooperative crop conditioning rolls journalled on said sub-frame structure behind said mower and extending parallel thereto, a crop gathering reel journalled on said sub-frame structure above said mower and forwardly of said conditioning rolls, said reel extending parallel to said mower and said crop conditioning rolls, means mounting said sub-frame structure on said main frame for vertical pivotal movement about a predetermined horizontal axis between a lowered position and a raised position, said predetermined axis being spaced below and extending substantially parallel to said other leg of said main frame, means interconnected between said sub-frame structure and said main frame for counterbalancing said sub-frame structure whereby the sub-frame may raise or lower about said predetermined axis and follow the contour of the ground, a gearbox carried by said main frame adjacent the apex of said one and said other main frame legs and having a power output shaft coaxial with said predetermined axis, said gearbox having a power input shaft extending forwardly along said one leg of said main frame for connection in driven relation to said power-take-off means on said towing vehicle, and first, second and third endless drive means drivingly connecting said power output shaft to said mower, said conditioning rolls and said reel respectively.

7. An agricultural machine as recited in claim 6 wherein said hitch means comprises a draft tongue extending generally forwardly from said one leg of said main frame, pivot means connecting said tongue to said one main frame leg for horizontal swinging movement between angularly spaced operative and road transport positions, a draft coupling member carried by said tongue at the forwardmost end thereof, said gearbox input shaft extending upwardly and forwardly under said one main frame leg and having a universal joint disposed vertically under said draft tongue pivot means, said input shaft having a forward extension extending upwardly and forwardly under said draft tongue from said universal joint and emerging above said draft tongue just rearwardly of said draft coupling, and brackets mounting said input shaft forward extension on said draft tongue.

References Cited
UNITED STATES PATENTS

| | | | |
|---|---|---|---|
| 2,349,923 | 5/1944 | Anderson et al. | |
| 2,989,829 | 6/1961 | Heth et al. | 56—1 |
| 3,100,373 | 8/1963 | Blanshine | 56—23 X |

ABRAHAM G. STONE, *Primary Examiner.*

ANTONIO F. GUIDA, *Examiner.*